United States Patent
Jeong et al.

(10) Patent No.: US 10,142,313 B2
(45) Date of Patent: Nov. 27, 2018

(54) SYSTEM AND METHOD FOR AUTHENTICATING USER USING CONTACT LIST

(71) Applicant: LINE Corporation, Shibuya-ku, Tokyo (JP)

(72) Inventors: Iryoung Jeong, Seongnam-si (KR); Ho Sung Kang, Seongnam-si (KR); Seonggu Huh, Seongnam-si (KR)

(73) Assignee: Line Corporation, Tokyo (JP)

( * ) Notice: Subject to any disclaimer, the term of this patent is extended or adjusted under 35 U.S.C. 154(b) by 31 days.

(21) Appl. No.: 15/206,603

(22) Filed: Jul. 11, 2016

(65) Prior Publication Data
US 2017/0063825 A1 Mar. 2, 2017

(30) Foreign Application Priority Data
Aug. 27, 2015 (KR) .................. 10-2015-0120745

(51) Int. Cl.
*H04L 29/06* (2006.01)
*H04L 29/12* (2006.01)

(52) U.S. Cl.
CPC .......... *H04L 63/08* (2013.01); *H04L 63/0876* (2013.01); *H04L 61/1594* (2013.01)

(58) Field of Classification Search
CPC ... H04L 63/08; H04L 63/083; H04L 63/0876; H04L 61/1594
See application file for complete search history.

(56) References Cited

U.S. PATENT DOCUMENTS

2004/0148506 A1* 7/2004 Prince .................. H04L 51/12
 713/176
2005/0268107 A1* 12/2005 Harris .................. G06F 21/31
 713/182

(Continued)

FOREIGN PATENT DOCUMENTS

KR 20060021614 A 3/2006
KR 100775567 B1 11/2007

(Continued)

OTHER PUBLICATIONS

Korean Office Action dated Sep. 9, 2016.

*Primary Examiner* — Ayoub Alata
(74) *Attorney, Agent, or Firm* — Harness, Dickey & Pierce, P.L.C.

(57) ABSTRACT

A user authentication system and method uses a contact list that may receive contact list information stored in an electronic device from the electronic device over a network. The system is further configured to store, in a database, and manage first contact list information received from a first electronic device of a user through the reception controller in association with an identifier of the user, compare second contact list information received from the first electronic device or a second electronic device to the first contact list information stored in the database in association with the identifier of the user, in response to a service request from the first electronic device or the second electronic device based on the identifier of the user; and determine whether to authenticate the user in response to the service request from the first electronic device or the second electronic device based on the comparison result.

12 Claims, 11 Drawing Sheets

(56) References Cited

U.S. PATENT DOCUMENTS

2011/0039582 A1* 2/2011 Kendall ................ G08G 1/202
 455/456.5
2013/0260893 A1 10/2013 Shin et al.
2013/0332543 A1 12/2013 Shin et al.
2014/0019540 A1 1/2014 Shin et al.

FOREIGN PATENT DOCUMENTS

KR 20100001798 A 1/2010
KR 20130093744 A 8/2013
WO WO-2015/065001 A1 5/2015

* cited by examiner

SYSTEM AND METHOD FOR AUTHENTICATING USER USING CONTACT LIST

CROSS-REFERENCE TO RELATED APPLICATION(S)

This application claims priority under 35 U.S.C. § 119 to Korean Patent Application No. 10-2015-0120745 filed Aug. 27, 2015, in the Korean Intellectual Property Office (KIPO), the entire contents of which are incorporated herein by reference.

BACKGROUND

Field

One or more example embodiments relate to systems and/or methods for authenticating a user using a contact list.

Description of Related Art

Various related arts relate to technology for authenticating a user. For example, a user may be authenticated based on an identifier and a password of the user directly input from the user, or using an additional authentication device, such as a one time password (OTP) and the like.

SUMMARY

One or more example embodiments provide a system and method that may authenticate and/or additionally authenticate a user using a contact list stored in an electronic device of the user.

At least one example embodiment provides a system of a server including one or more processors configured to execute computer-readable instructions to, control the server to receive contact list information from a first electronic device over a network, the first contact list information stored in the first electronic device, control the server to store, in a database, and manage the first contact list information in association with an identifier of a user of the first electronic device, control the server to compare second contact list information to the first contact list information in association with the identifier of the user, the second contact list information from the first electronic device or a second electronic device, the one or more processors configured to control the server to compare in response to a service request from the first electronic device or the second electronic device based on the identifier of the user, and control the server to determine whether to authenticate the user in response to the service request from the first electronic device or the second electronic device based on a result of the comparing.

The one or more processors is further configured to control the server to determine whether a ratio of common contacts in the first contact list information and the second contact list information with respect to contacts in the first contact list information is greater than or equal to a threshold ratio, and the one or more processors may be further configured to control the server to authenticate the user if the ratio of common contacts in the first contact list information and the second contact list information is greater than or equal to the threshold ratio.

The one or more processors may be further configured to control the server to store and manage a first portion of contacts in the first contact list information in the database if a number of contacts in the first contact list information is greater than or equal to a threshold value, and the one or more processors may be further configured to control the server to compare at least a second portion of contacts in the second contact list information to the first portion of the contacts included in the first contact list information.

The one or more processors may be further configured to control the server to generate first hash values by converting first contacts in the first contact list information using a hash function, the one or more processors configured to store and manage the generated first hash values in the database in association with the identifier of the user, and the one or more processors may be further configured to control the server to generate second hash values by converting second contacts in the second contact list information using the hash function, the one or more processors configured to compare the generated second hash values to the generated first hash values.

The one or more processors may be further configured to control the server to store and manage first values of one or more items of a first name, a first telephone number, and a first e-mail address the first contact list information, in the database, and the comparison controller may be further configured to extract values of one or more items of a name, a telephone number, and an e-mail address from each of contacts included in the second contact list information, and the one or more processors configured to compare the extracted second values to the first values stored in the database.

The one or more processors may be further configured to control the server to store and manage a first portion of a first character string in a desired item of contacts in the first contact list information, in the database, and the one or more processors may be further configured to compare a second portion of a second character string in a desired item of contacts in the second contact list information to the first portion of the first character string stored in the database.

At least one example embodiment provides a method including displaying, at an electronic device, a user interface for inputting user authentication information on a screen, the user interface under control of an application executed on the electronic device, transmitting, at the electronic device, the user authentication information to a server over a network for the first user authentication, the first transmitting being under control of the application, and extracting, at the electronic device, contact list information for second user authentication of a user from a storage medium of the electronic device, second transmitting the extracted contact list information to the server over the network, the second transmitting being under control of the application. The server performs the first user authentication based on the user authentication information and performs the second user authentication by comparing previous contact list information stored in a database of the server to the transmitted contact list information, the previous contact list information being stored in association with the user authentication information, and the previous contact list information includes information that is received at the server from the electronic device or another electronic device under control of the application.

In an example embodiment, the server determines whether a ratio of common contacts in the previous contact list information and the transmitted contact list information with respect to contacts in the previous contact list information in is greater than or equal to a threshold ratio, and the server performs the second user authentication if the ratio of common contacts is greater than or equal to the threshold ratio.

In an example embodiment, the second transmitting transmits a portion of contacts in the extracted contact list information to the server if a number of the contacts in the extracted contact list information is greater than or equal to a threshold value.

In an example embodiment, the second transmitting includes generating hash values by converting the contacts in the extracted contact list information using a hash function, and transmitting the generated hash values to the server.

In an example embodiment, the second transmitting transmits values of one or more items of a name, a telephone number, and an e-mail address from the contacts in the contact list information to the server.

In an example embodiment, the second transmitting transmits a portion of a character string in a desired item of the contacts in the extracted contact list information to the server.

In an example embodiment, a non-transitory computer-readable medium comprising a program, when executed by one or more processors, configured to cause the one or more processors to perform the method of claim 8.

In an example embodiment, the one or more processors is configured to authenticate the user in response to the determination.

According to at least some example embodiments, it is possible to authenticate and/or additionally authenticate a user using a contact list stored in an electronic device of the user.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
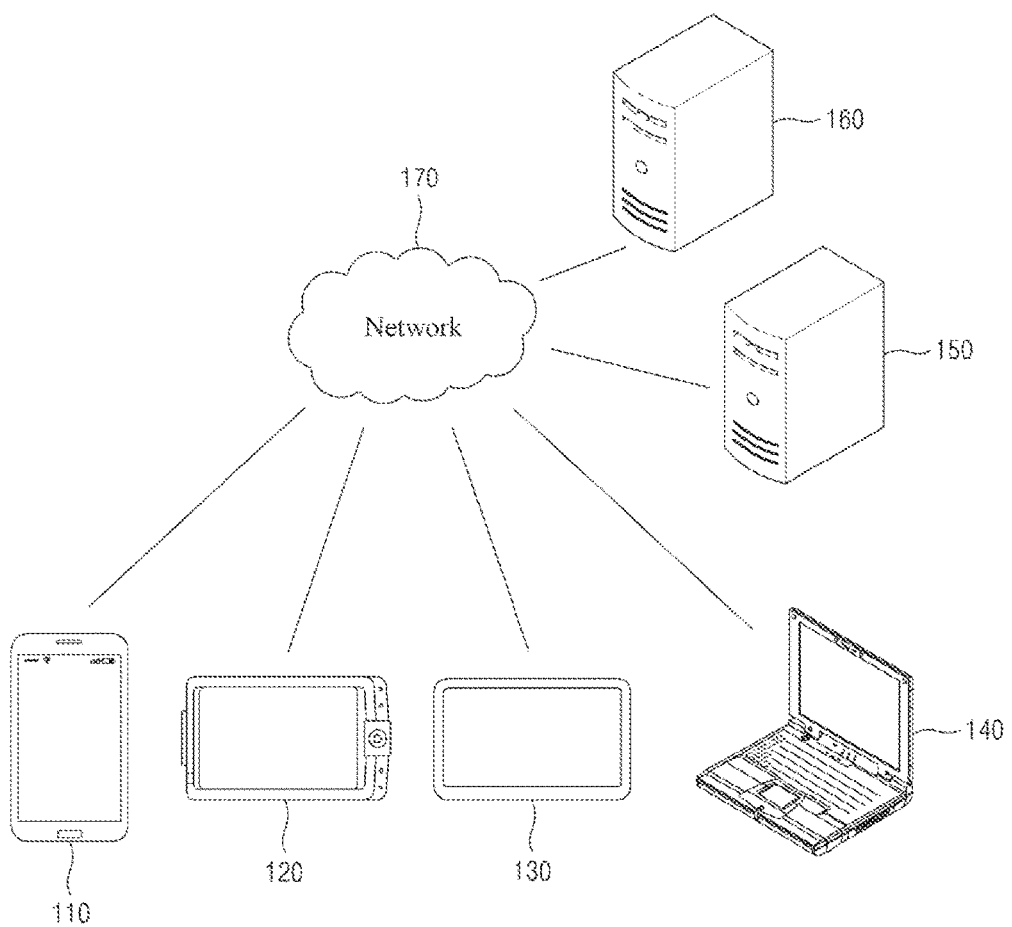
FIG. 1 is a diagram illustrating a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments relate to technology for recommending a meeting place using appointment information. In detail, the example embodiments relate to a method, system, and non-transitory computer-readable medium that may provide appointment information of a meeting users are to attend to affiliated stores, may receive a recommendation on a meeting place from the affiliated stores, and may provide the received recommendation information to the users.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer processing device. For example, the plurality of electronic devices 110, 120, 130, and 140 may be a smartphone, a mobile phone, navigation, computer, a laptop computer, a digital broadcasting terminal, a personal digital assistant (PDA), a portable multimedia player (PMP), a tablet PC, and the like. For example, the electronic device 110 may communicate with other electronic devices 120, 130, and 140, and/or the servers 150 and/or 160 over the network 170 in a wired communication manner or in a wireless communication manner.

The communication scheme is not particularly limited and may include a communication scheme that uses near field communication between devices as well as a communication method using a communication network, for example, a mobile communication network, the wired Internet, the wireless Internet, and a broadcasting network. For example, the network 170 may include at least one of networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of an operating system (OS) included in the electronic device 110 and at least one program, for example, browser or the installed application. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under control of the application.

To provide a service and/or content, the server 150 may need to authenticate the user. According to at least some example embodiments, technology that enables the server 150 to authenticate the user connected through the electronic device 110 based on contact list information stored in the electronic device 110 is described.

Figure 2:
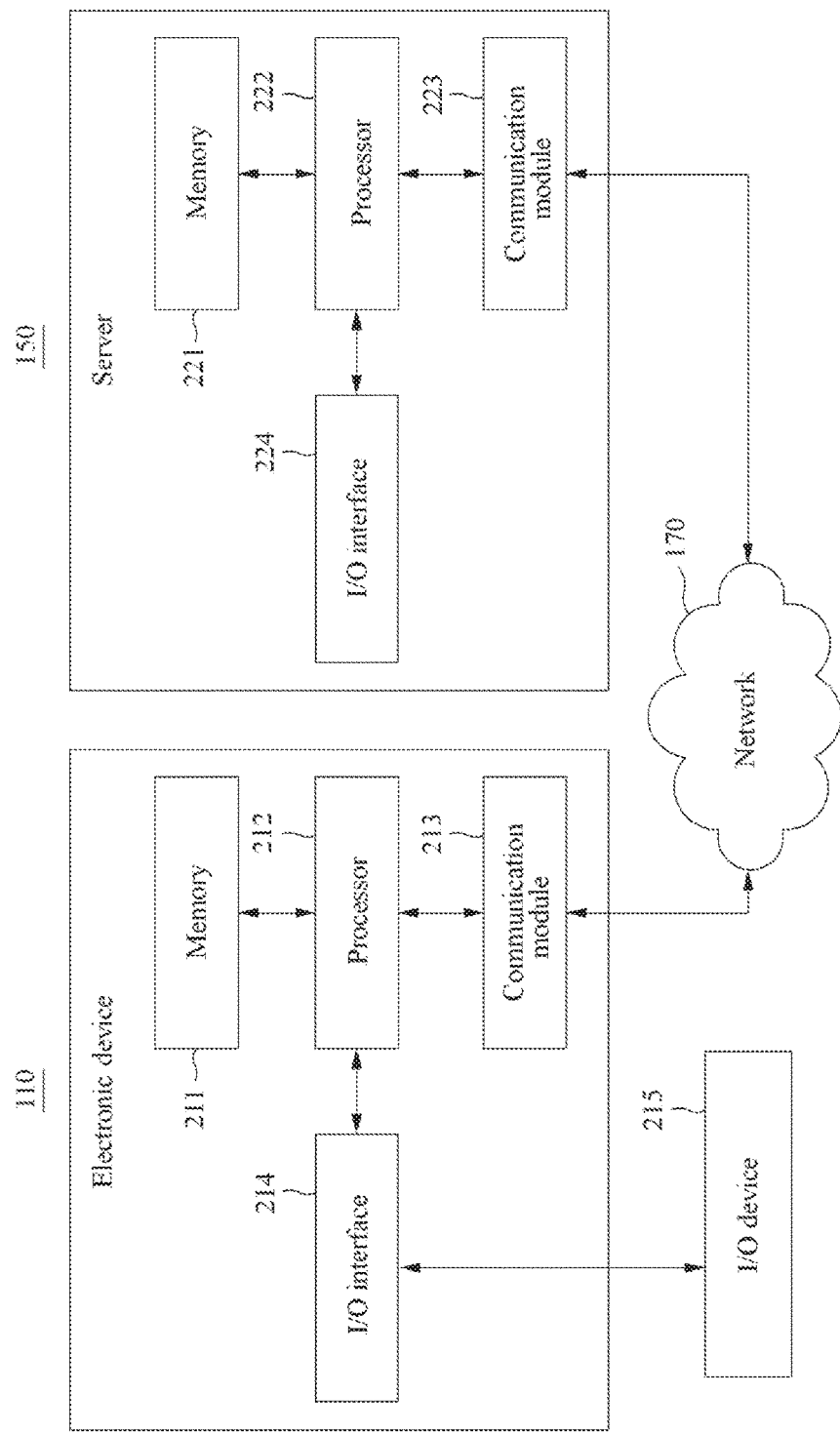
FIG. 2 is a block diagram illustrating a configuration of an electronic device and a server according to at least one example embodiment.

FIG. 2 is a block diagram strafing a configuration of an electronic device and a server according to at least one example embodiment. Also, FIG. 2 illustrates a configuration of the electronic device 110 as an example for a single electronic device and illustrates a configuration of the server 150 as an example for a single server. The other electronic devices 120, 130, and 140, and/or the server 160 may have the same or similar configuration as the electronic, device 110 and/or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, computer-readable instructions for the browser or the application installed and executed on the electronic device 110, may be stored in the memory 211, 221. Such software constituent elements may be loaded from another computer-readable storage medium separate from the memories 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memories 211, 221 through the communication module 213, 223, instead of, or in addition to, the computer-readable storage medium. For example, at least one program may be loaded to the memories 211, 221 based on a program, for example, the application, installed by files provided over the network 170 from developers or a file distribution system, for example, the server 150 of FIG. 1 that provides an installation file of the application.

The processors 212, 222 may be configured to process computer-readable instructions, for example, the aforementioned at least one program code, of a computer program by performing basic arithmetic operations, logic operations, and I/O operations. The computer-readable instructions may be provided from the memories 211, 221 and/or the communication modules 213, 223 to the processors 212, 222. For example, the processors 212, 222 may be configured to execute received instructions in response to the program code stored in the storage device such as the memories 211, 221.

The communication modules 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a streaming service request for content, generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interfaces 214, 224 may be a device used for interfacing with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O devices 215, or may further include other constituent elements, for example, a transceiver, a global positioning system (GPS) module, a camera, a variety of sensors, a database, and the like.

Figure 3:
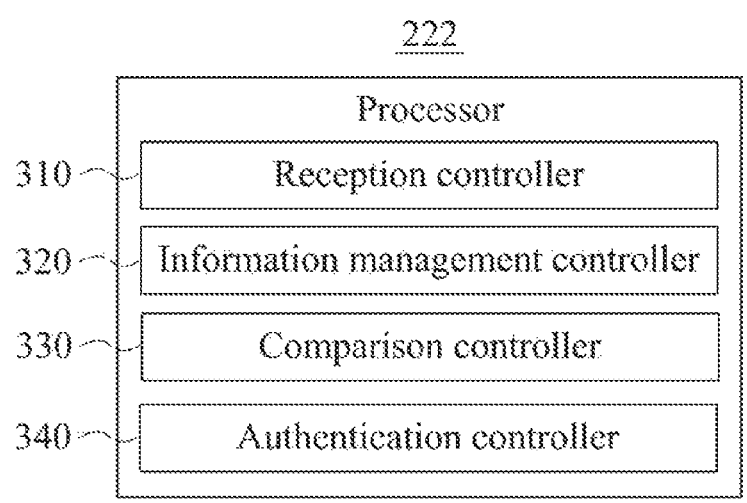
FIG. 3 is a block diagram illustrating an example of constituent elements includable in a processor of a server according to at least one example embodiment.
Figure 4:
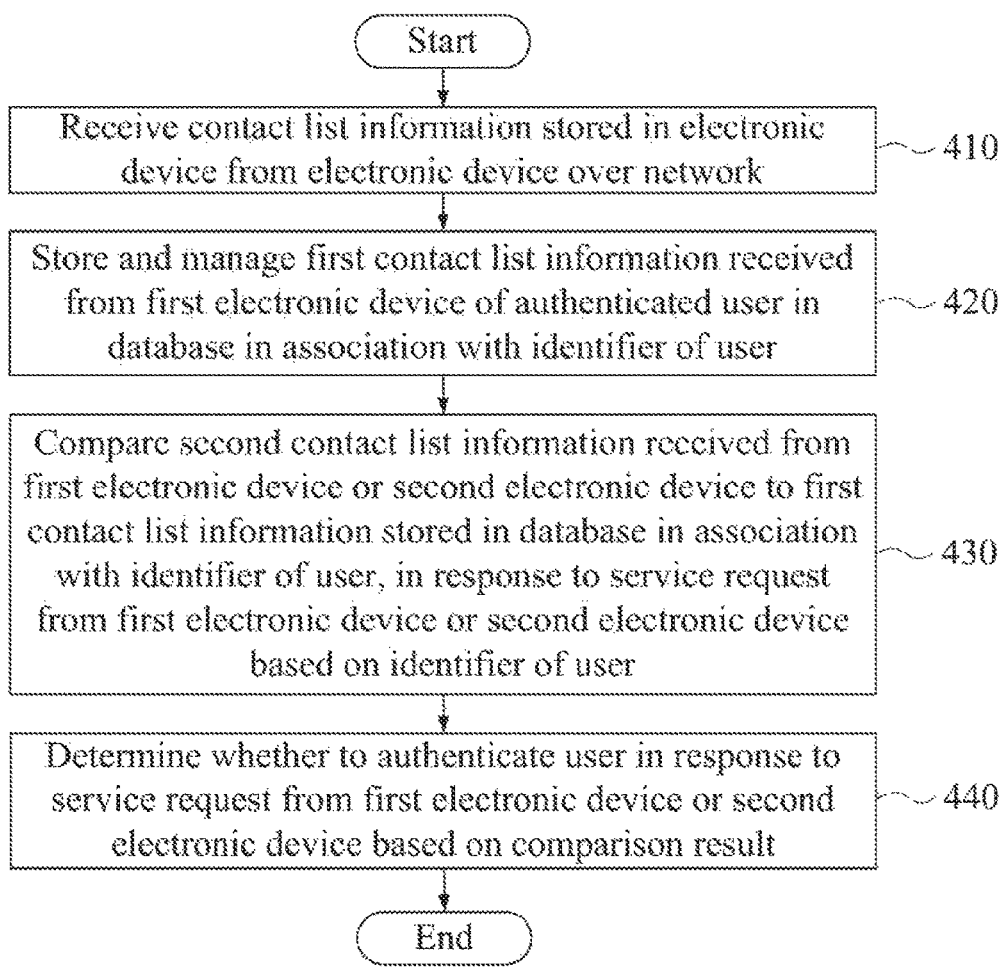
FIG. 4 is a flowchart illustrating a method performed at a server according to at least one example embodiment.

FIG. 3 is a block diagram illustrating an example of constituent elements includable in a processor of a server according to at least one example embodiment, and FIG. 4 is a flowchart illustrating a method performed at a server according to at least one example embodiment. Referring to FIG. 3, the processor 222 of the server 150 may include a reception controller 310, an information management controller 320, a comparison controller 330, and an authentication controller 340. Constituent elements of the processor 222 may control the server 150 to perform operations 410 through 440 of FIG. 4, and, to this end, may be configured to operate through the OS and at least one program code included in the memory 221.

In operation 410, the server 150 may receive contact list information stored in an electronic device from the electronic device over a network. The reception controller 310 may control the server 150 to perform operation 410. For example, the server 150 may receive contact list information for each of electronic devices, for example, the electronic devices 110, 120, 130, and 140 of FIG. 1, to which the server 150 provides a service, over the network, for example, the network 170. The contact list information may be transferred from the electronic device to the server 150 in response to a request from the server 150, may be transferred to the server 150 every time the electronic device connects to the server 150, and may be transferred to the server 150 if a desired (or, alternatively, predetermined) condition is met, for example, if the electronic device attempts an initial connection to the server 150.

The contact list information is a list of contacts of persons stored in the electronic device, and may include basic items, such as a name, a telephone number (a wired telephone number and/or a mobile telephone number), an e-mail address, and the like, and may include additional items, such as a group, a ring-back tone, a related homepage, relationship information, and the like.

In operation 420, the server 150 may store and manage first contact list information received from a first electronic device of the user in a database in association with an identifier of the user. The information management controller 320 may control the server 150 to perform operation 420. For example, the first contact list information may be a contact list of the first electronic device received through the reception controller 310, and the server 150 may store and manage the first contact list information in the database. The database may be included in the server 150 or may be included in a separate system. For example, the server 150 may transmit the received first contact list information to a separate system over the network such that the first contact list information may be stored in the database. Also, the server 150 may request the separate system for the first contact list information using the identifier of the user. In this case, the separate system may extract the first contact list information corresponding to the request and may transmit the extracted first contact list information to the server 150.

The first contact list information may be transmitted from the first electronic device to the server 150 under control of an application installed in the first electronic device. For example, in response to an initial connection of the first electronic device to the server 150 or a request of the server 150 under control of the application of the first electronic device, the first contact list information may be transmitted from the first electronic device to the server 150. Also, the first contact list information may be transmitted to the server 150 and updated in response to a request of the server 150 or periodically based on settings of the first electronic device. The server 150 may receive contact list information from electronic devices that desire to connect to the server 150 and use a service, may manage the contact list information for each user, and may use the contact list information as reference information to authenticate a user.

In operation 430, in response to a service request from the first electronic device or a second electronic device based on the identifier of the user, the server 150 may compare second contact list information received from the first electronic device or the second electronic device to the first contact list information stored in the database in association with the identifier of the user. The comparison controller 330 may control the server 150 to perform operation 430.

Such comparison may be performed every time a service request is received based on the identifier of the user, and may be performed if a desired (or, alternatively, predetermined) condition is satisfied. The condition may include a case in which the user connects after a desired (or, alternatively, preset) period of time is elapsed from a last connection or a case in which the user connects with an electronic device, for example, the second electronic device, different from an electronic device, for example, the first electronic device, used for the last connection. A variety of methods may be used to compare the first contact list information and the second contact list information, which is described below.

In operation 440, the server 150 may determine whether to authenticate the user in response to a service request from the first electronic device or the second electronic device based on a comparison result. The authentication controller 340 may control the server 150 to perform operation 440. For example, the server 150 may authenticate the user if a similarity between first contact list information and second contact information is greater than or equal to a threshold similarity. The term "contact list information" includes a contact list, described above, and the term "similarity between different items of list information" may be calculated as a rate that common acquaintance contacts are included in the contact lists. Accordingly, a similarity between contact list information of even close users, for example, a father and a son, brothers, etc., may be relatively low. A similarity between contact list information of irrelevant users may be significantly low. Thus, if a similarity between first contact list information enrolled by a user and second contact list information transmitted later is greater than or equal to a threshold similarity as a result of comparing the first contact list information to the second contact list information, the server 150 may determine that a service is requested from an electronic device of the user based on an identifier of the user and may authenticate the user. Here, the server 150 may perform additional user authentication if a primary user authentication is performed using the identifier and a password of the user.

For example, if the user changes a using device from the first electronic device to the second electronic device, the user may request a service by connecting to the server 150 with the second electronic device. In this example, the server 150 may authenticate or additionally authenticate the user by receiving contact list information, of the second electronic device and by comparing the contact list information of the second electronic device to the existing contact list information received from the first electronic device.

In detail, with respect to contacts included in first contact list information and contacts included in second contact list information, the server 150 may compare whether a ratio of common contacts included in the first contact list information and the second contact list information is greater than or equal to a threshold ratio, and may authenticate the user if the ratio of common contacts included in the first contact list information and the second contact list information is greater than or equal to the threshold ratio. The ratio used for the comparison may be preset through an empirical method by comparing contact lists of actual users in advance. For example, a developer or the server 150 may compare contact lists of a plurality of users may calculate ratios that common contacts are included, and may preset a maximum value of the calculated ratios or a statistical value that is acquired based on the calculated ratios as a reference ratio.

Figure 5:
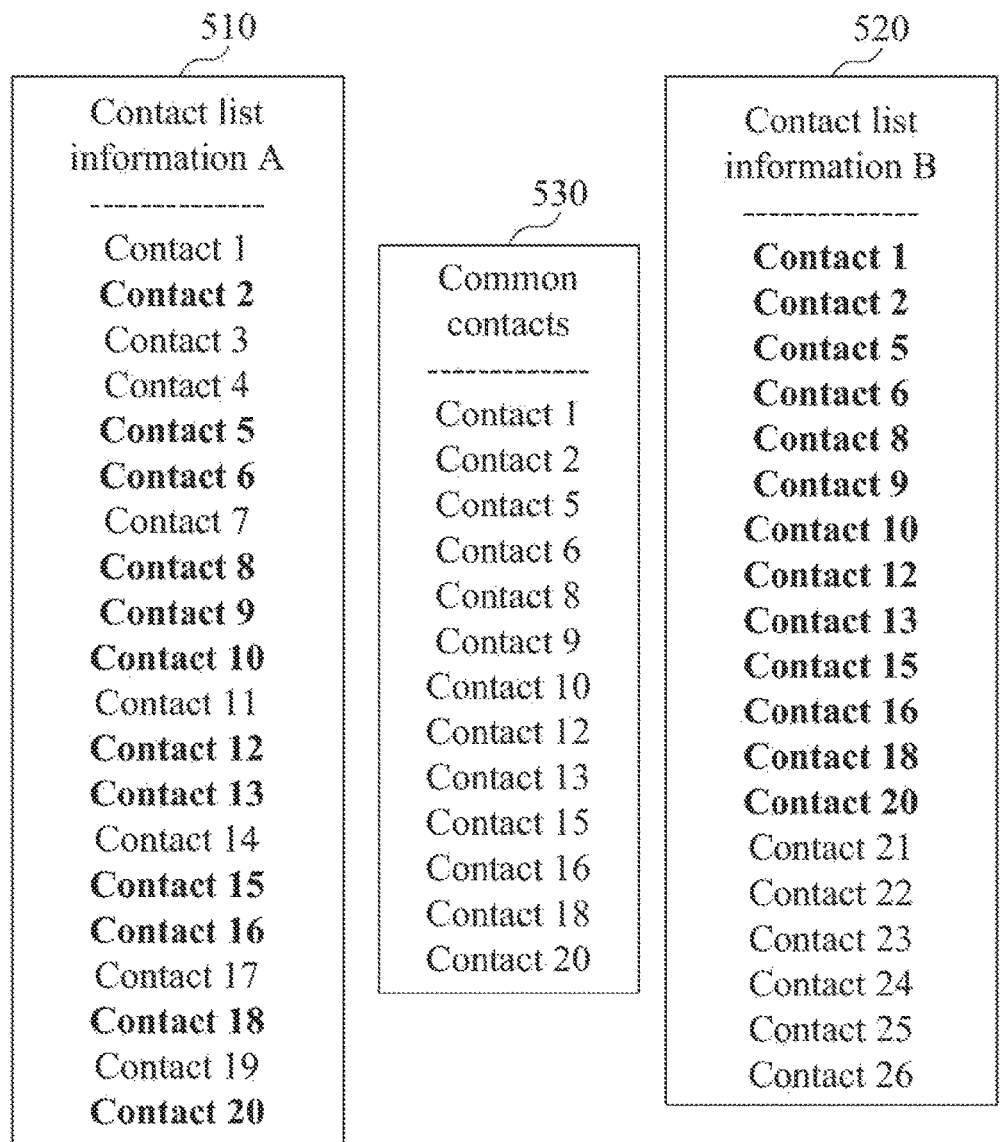
FIG. 5 illustrates an example of comparing contact list information according to at least one example embodiment.

FIG. 5 illustrates an example of comparing contact list information according to at least one example embodiment. In FIG. 5, a reference ratio used for comparison is assumed as 15%. Contact list information A 510 may correspond to first contact list information received through a first electronic device, and contact list information B 520 may correspond to second contact list information received through a second electronic device. In FIG. 5, the contact list information A 510 is a contact list that includes 20 contacts and the contact list information B 520 is a contact list that includes 19 contacts. In this example, the server 150 may verify common contacts 530 that are commonly included in the contact list information A. 510 and the contact list information B 520 and may verify that the number of common contacts 530 is 13. The server 150 may calculate a ratio of the common contacts 530 as 65% (=13/20*100). In this case, the server 150 may authenticate the user as an appropriate user with response to a service request based on an identifier of the user.

Although another user irrespective of the user attempts to connect to the server 150 with an identifier and a password of the user, a probability that contacts stored in an electronic device of the other user are identical to contacts stored in the electronic device of the user by a desired (or, alternatively, preset) ratio is significantly low. Thus, a user authentication for a service request based on the identifier of the user may be refused.

As described above, even in the case of different items of contact list information of users that are acquaintances, a ratio of common contacts therein may be significantly low. The number of contacts stored in electronic devices of users may differ from each another. Accordingly, there is no need to compare all of received contacts. To reduce a calculation amount, the server 150 may store and manage a portion of contacts included in first contact list information in a database if the number of contacts included in the first contact list information is greater than or equal to a threshold value. That is, the desired number or lesser number of contacts may be selected from among the contacts included in the first contact list information and may be stored in the database.

Figure 6:
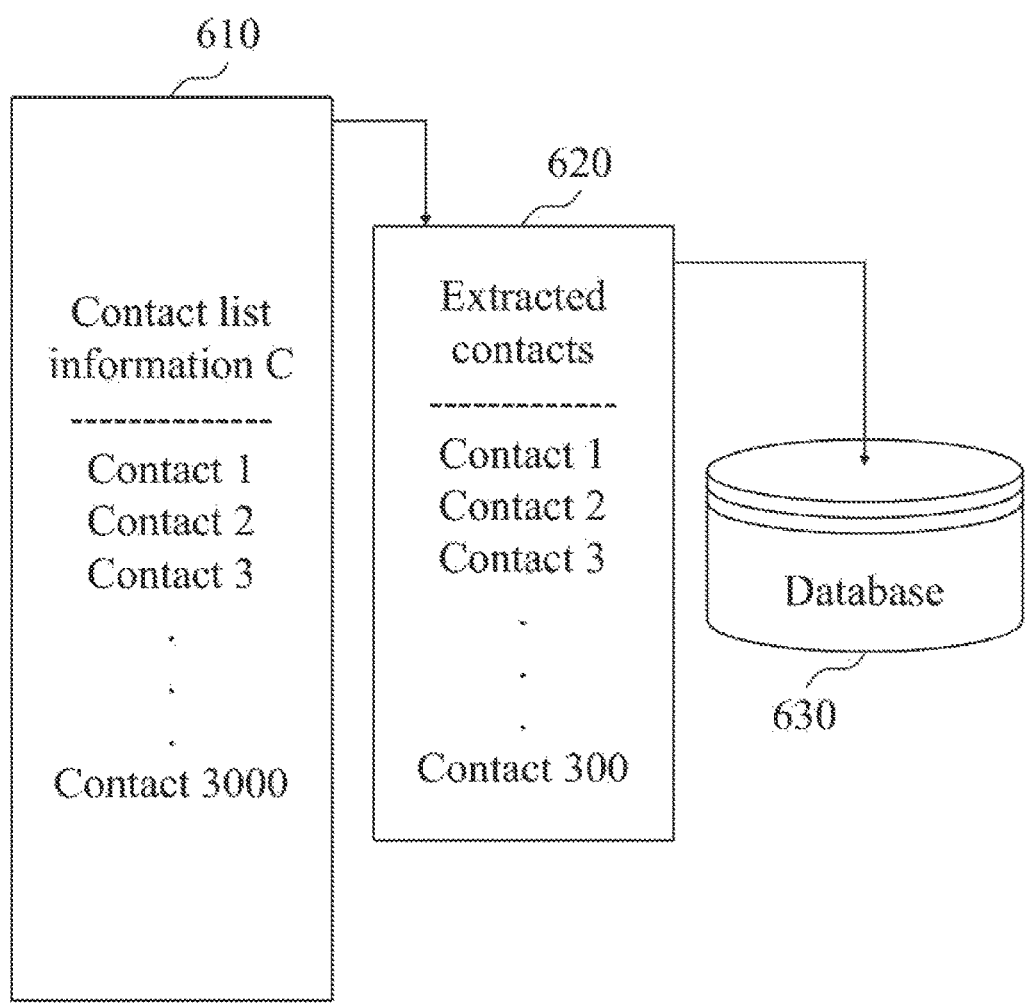
FIG. 6 illustrates an example of storing and comparing a portion of contacts according to at least one example embodiment.

FIG. 6 illustrates an example of storing and comparing a portion of contacts according to at least one example embodiment. FIG. 6 illustrates an example in which contact list information C 610 received from a third electronic device includes 3000 contacts and the server 150 extracts 300 contacts from among the contacts of the contact list information C 610 and stores the extracted contacts 620 in a database 630. Although FIG. 6 illustrates an example of extracting 300 contacts in order in which the contacts are included in the contact list information C 610, the server 150 may extract top 300 contacts by sorting the contacts using a variety of methods, for example, in order of names, telephone numbers, etc. Alternatively, the server 150 may extract 300 contacts in inverse order starting from a last contact of the list. If the received contact list information includes the number of contacts less than a threshold value, all of the contacts included in the contact list information may be stored.

In response to a service request based on an identifier of a user of the third electronic device being received from a fourth electronic device, the server 150 may compare contacts included in contact list information of the fourth electronic device to contacts, for example, the extracted contacts 620, stored in the database 630 in association with the identifier of the user. If the number of contacts included in the contact list information of the fourth electronic device exceeds a threshold value, a portion of the contacts included in the contact list information of the fourth electronic device may be extracted and used for comparison. For example, the desired (or, alternatively, preset) number of contacts may be extracted and used for comparison.

In this example, in operation 430, the server 150 may compare a portion of the contacts included in the second contact list information to a portion of the contacts included in the first contact list information stored in the database. For example, if the second contact list information includes the desired number or greater number of contacts, the server 150 may extract the same number of contacts from the second contact list information, and may compare the extracted contacts to the contacts stored in the database.

In another example embodiment, contacts may be stored in the database in a form of a hash value. For example, in operation 420, the server 150 may generate first hash values by converting each of the contacts included in the first contact list information using a hash function and may store and manage the generated first hash values in the database in association with the identifier of the user. Also, in operation 430, the server 150 may generate second hash values by converting each of the contacts included in the second contact list information using the hash function and may compare the generated second hash values to the first hash values. Since the hash function converts a hash value as the same output with respect to the same input, a desired result may be acquired by comparing hash values.

Figure 7:
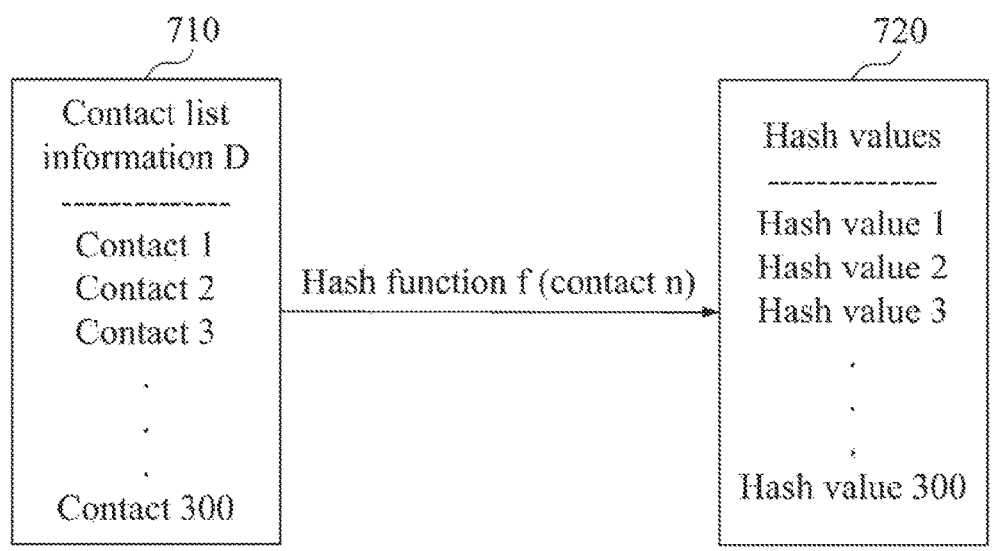
FIG. 7 illustrates an example of converting contacts to a form of a hash value according to at least one example embodiment.

FIG. 7 illustrates an example of converting contacts to a form of a hash value according to at least one example embodiment. Referring to FIG. 7, contact list information D 710 received from a fifth electronic device is an example of a contact list that includes 3000 contacts, and the server 150 may generate hash values 720 of the respective contacts using a hash function f (contact n) that uses the contacts as an input, where n is a contact identifier. Since the hash function may output the same hash value in response to a different input, the number of hash values 720 may be less than the number of contacts included in the contact list information D 710.

In response to a service request from a sixth electronic device based on an identifier of a user having transmitted the contact list information. D 710, the server 150 may generate hash values of the respective contacts by receiving contact list information from the sixth electronic device and may compare the generated hash values to hash values stored in the database in association with the identifier of the user.

In another example embodiment, a portion of items included in contacts may be stored in the database. For example, in operation 420, the server 150 may store and manage values of one or more items of a name, a telephone number, and an e-mail address of each of contacts included in the first contact list information, in the database. In this case, in operation 430, the server 150 may extract values of one or more items of a name, a telephone number, and an e-mail address from each of contacts included in the second contact list information, and may compare the extracted values to the values stored in the database.

Figure 8:
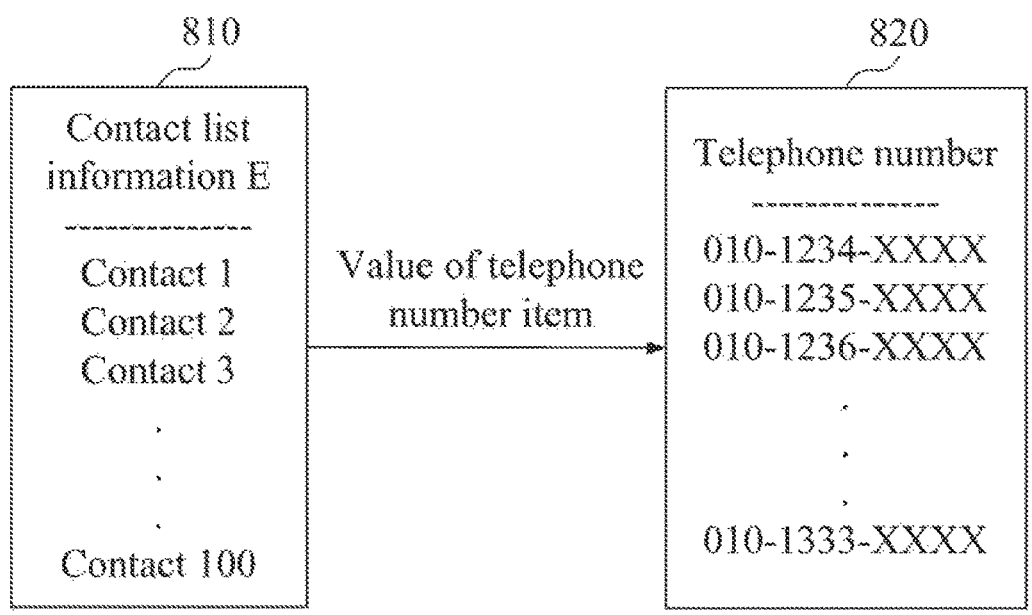
FIG. 8 illustrates an example of extracting and storing values of a telephone number item from contacts according to at least one example embodiment.

FIG. 8 illustrates an example of extracting and storing values of a telephone number item from contacts according to at least one example embodiment. Referring to FIG. 8, contact list information E 810 of a seventh electronic device is an example of a contact list that includes 100 contacts, and the server 150 may extract telephone numbers 820 that are values of a telephone number item from the respective contacts included in the contact list information E 810, and may store the extracted telephone numbers 820 in a database. Here, in response to a service request from an eighth electronic device based on an identifier of a user of the seventh electronic device, the server 150 may receive contact list information from the eighth electronic device, may extract values of the telephone number item from contacts included in the received contact list information, and may compare the extracted values to the telephone numbers 820 stored in the database.

In another example embodiment, a portion of values included in items of contacts may be stored in the database. For example, in operation 420, the server 150 may store and manage a portion of a character string included in a desired (or, alternatively, preset) item of each of the contacts included in the first contact list information, in the database. In this case, in operation 430, the server 150 may compare a portion of a character string included in a desired (or, alternatively, preset) item of each of contacts included in the second contact list information to the portion of the character string stored in the database.

Figure 9:
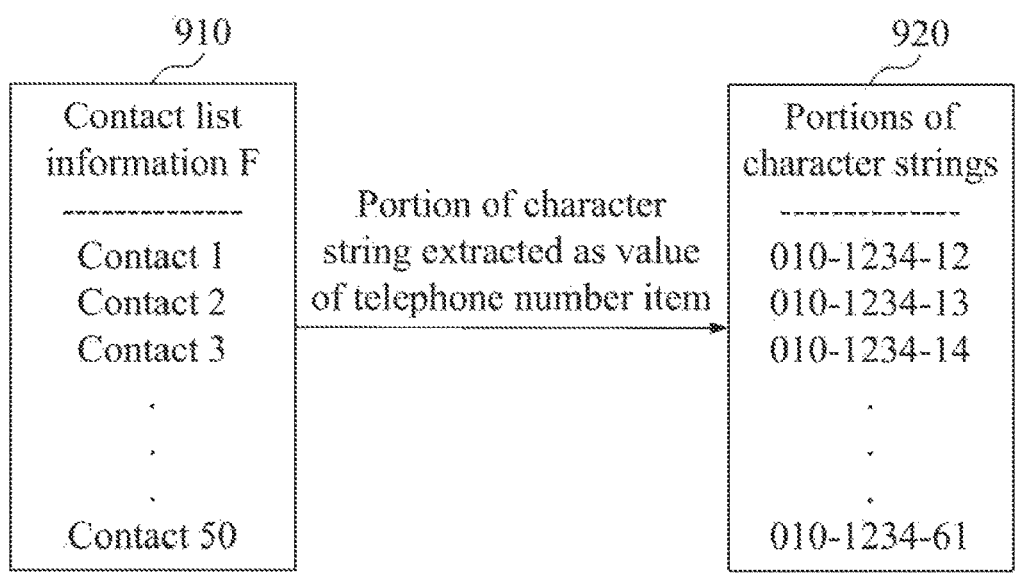
FIG. 9 illustrates an example of extracting a portion of a character string according to at least one example embodiment.

FIG. 9 illustrates an example of extracting a portion of a character string according to at least one example embodiment. Referring to FIG. 9, contact list information F 910 of a ninth electronic device is an example of a contact list that includes 50 contacts and the server 150 may extract character strings that are values of a telephone number item from the respective contacts included in the contact list information F 910. The server 150 may store portions 920 of the respective extracted character strings in a database. The portions 920 of the character strings include remaining characters aside from last two digits of telephone numbers.

Similar to the aforementioned description, the server 150 may extract portions of character strings from contact list information to be compared in the same manner and may compare the extracted portions of the character strings to the portions 920 of the character strings stored in the database.

The aforementioned various example embodiments may be combined. For example, it is possible to generate and use a hash value by applying a hash function to a portion of a character string extracted from a telephone number item or to generate and use a hash value by applying the hash function to each of values of two or more items.

Figure 10:
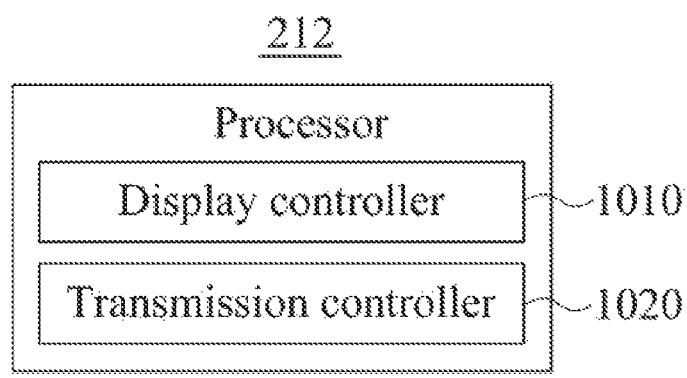
FIG. 10 is a block diagram illustrating an example of constituent elements includable in a processor of an electronic device according to at least one example embodiment.
Figure 11:
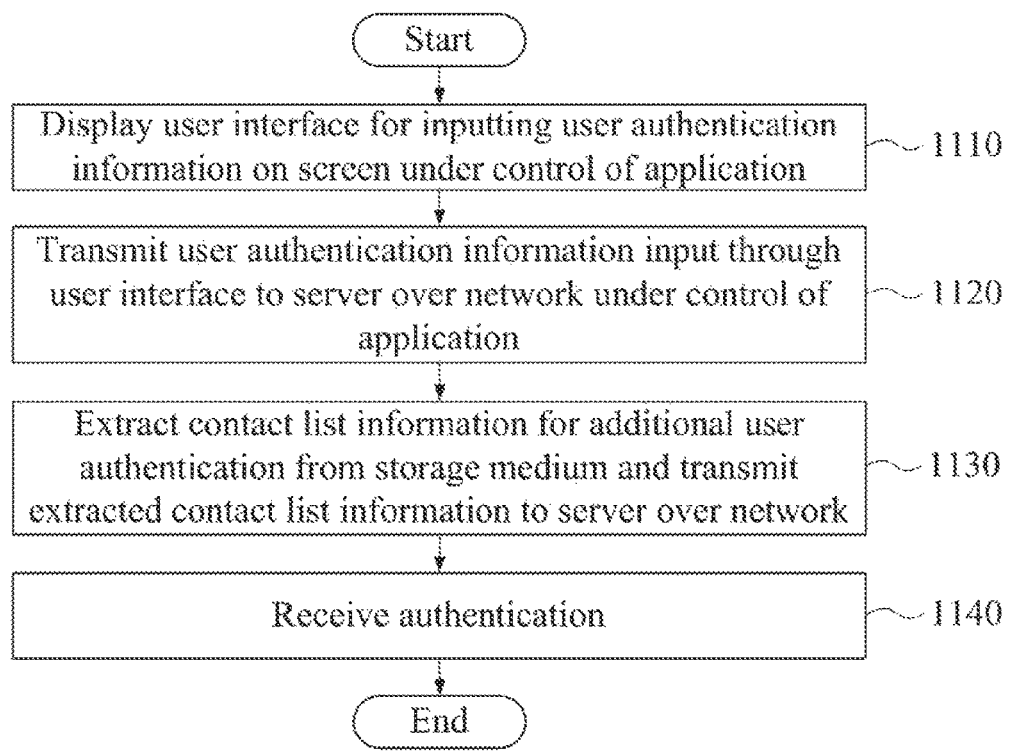
FIG. 11 illustrates a method performed at an electronic device according to at least one example embodiment.

FIG. 10 is a block diagram illustrating an example of constituent elements includable in a processor of an electronic device according to at least one example embodiment, and FIG. 11 illustrates a method performed at an electronic device according to at least one example embodiment.

Referring to FIG. 10, the processor 212 of the electronic device 110 may include a display controller 1010 and a transmission controller 1020. The constituent elements of the processor 212 may control the electronic device 110 to perform operations 1110 to 1140 of FIG. 11, and, to this end, may be configured to operate through at least one program code and the OS included, in the memory 211. The at least one program code may include a code of an application installed and executed on the electronic device 110 to provide a service of a server, for example, the server 150, to the electronic device 110.

In operation 1110, the electronic device 110 may display a user interface for inputting user authentication information on a screen under control of the application. The display controller 1010 may control the electronic device 110 to perform operation 1110 based on a code of the application.

For example, if the electronic device 110 is to connect to a server, the server may transmit a code for a login page to the electronic device 110 and the electronic device 110 may display the login page based on the received code and the code of the application. In this example, the user interface may be a login interface for inputting an identifier and a password of the user.

In operation 1120, the electronic device 110 may transmit the user authentication information input through the user interface to the server over a network under control of the application. The transmission controller 1020 may control the electronic device 110 to perform operation 1120 based on the code of the application.

For example, in response to the identifier and the password input from the user using the user interface, the electronic device 110 may request a login of the user by transmitting the input identifier and password to the server.

In operation 1130, the electronic device 110 may extract contact list information for additional user authentication from a storage medium and may transmit the extracted contact list information to the server over the network. The transmission controller 1020 may control the electronic device 110 to perform operation 1130.

As described above, the contract list information may include contacts stored in the electronic device 110. The electronic device 110 may extract contact list information that is a list of contacts stored in the storage medium and may transmit the extracted contact list information to the server.

The server may perform primary user authentication based on the user authentication information and may perform additional user authentication by comparing previous contact list information stored in the database of the server in association with the user authentication information to the transmitted contact list information. The previous contact list information may include information that is received at the server from the electronic device 110 in which the application is installed or another electronic device in which the application is installed under control of the application.

As described above, the server may determine whether a desired ratio of common contacts included in the previous contact list information and the transmitted contact list information with respect to contacts included in the previous contact list information and contacts included in the transmitted contact list information is greater than or equal to a threshold ratio. The server may perform the additional user authentication if the ratio of common contacts included in the previous contact list information and the transmitted contact list information is greater than or equal to the threshold ratio.

Thus, a user of the electronic device 110 may be authenticated based on the ratio of common contacts. In operation 1140, the electronic device 110 may receive authentication form the server.

The example embodiments in which electronic devices transmit contact lists to a server as contact list information, and the server stores and compares contacts or modification of the contacts, for example, item values, hash values, etc., are described. According to other example embodiments, electronic devices may modify contacts and transmit the modified contacts to the server. For example, the electronic device 110 may generate hash values by converting each of contacts included in extracted contact list information using a hash function and may transmit the generated hash values to the server or may transmit values of one or more items of a name, a telephone number, and an e-mail address from each of the contacts to the server. As another example, the electronic device 110 may transmit a portion of a character string included in a desired (or, alternatively, preset) item of each of the contacts included in extracted contact list information to the server.

In addition, various modifications, such as an example of storing contacts in a matrix structure of item-by-item values, for example, a matrix structure in which values of a single item constitute a single column or row, and finding and comparing the same values in the matrix structures, and the like, may be made.

According to at least some example embodiments, it is possible to authenticate and/or additionally authenticate a user using a contact list stored in an electronic device of the user.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system of a server comprising:
   one or more processors configured to execute computer-readable instructions to,
   control the server to receive first contact list information from a first electronic device over a network, the first contact list information stored in the first electronic device;
   control the server to store, in a database, and manage the first contact list information in association with an identifier of a user of the first electronic device;
   control the server to determine if a number of contacts in the first contact list information is greater than or equal to a threshold value;
   control the server to store and manage a first portion of contacts in the first contact list information in the database if the number of contacts in the first contact list information is greater than or equal to the threshold value;
   control the server to compare second contact list information to the first contact list information in association with the identifier of the user, the second contact list information from the first electronic device or a second electronic device, the one or more processors configured to control the server to compare in response to a service request from the first electronic device or the second electronic device based on the identifier of the user; and
   control the server to determine whether to authenticate the user in response to the service request from the first electronic device or the second electronic device based on a result of the comparing,
   wherein the one or more processors is configured to perform the comparing the second contact list information to the first contact list information by comparing at least a second portion of contacts in the second contact list information to the first portion of the contacts in the first contact list information if the number of contacts in the first contact list information is greater than or equal to the threshold value.

2. The system of claim 1, wherein the one or more processors is further configured to control the server to determine whether a ratio of common contacts in the first contact list information and the second contact list information with respect to contacts in the first contact list information is greater than or equal to a threshold ratio, and the one or more processors is further configured to control the server to authenticate the user if the ratio of common contacts in the first contact list information and the second contact list information is greater than or equal to the threshold ratio.

3. The system of claim 1, wherein the one or more processors is further configured to control the server to generate first hash values by converting first contacts in the first contact list information using a hash function, the one or more processors configured to store and manage the generated first hash values in the database in association with the identifier of the user, and
   the one or more processors is further configured to control the server to generate second hash values by converting second contacts in the second contact list information using the hash function, the one or more processors configured to compare the generated second hash values to the generated first hash values.

4. The system of claim 1, wherein the one or more processors is further configured to control the server to store and manage first values of one or more items of a first name, a first telephone number, and a first e-mail address in the first contact list information, in the database, and
   the one or more processors is further configured to extract second values of one or more items of a second name, a second telephone number, and a second e-mail address from the second contact list information, and the one or more processors configured to compare the extracted second values to the first values stored in the database.

5. The system of claim 1, wherein the one or more processors is further configured to control the server to store and manage a first portion of a first character string in a first desired item of contacts in the first contact list information, in the database, and
   the one or more processors is further configured to compare a second portion of a second character string in a second desired item of contacts in the second contact list information to the first portion of the first character string stored in the database.

6. A method comprising:
   displaying, at an electronic device, a user interface for inputting user authentication information on a screen, the user interface under control of an application executed on the electronic device;
   first transmitting, at the electronic device, the user authentication information to a server over a network for a first user authentication, the first transmitting being under control of the application;
   extracting, at the electronic device, contact list information for second user authentication of a user from a storage medium of the electronic device;
   determining whether a number of contacts in the extracted contact list information is greater than or equal to a threshold value; and
   second transmitting a portion of contacts in the extracted contact list information to the server over the network in response to the number of the contacts in the extracted contact list information being greater than or equal to the threshold value, the second transmitting being under control of the application,
   wherein the server performs the first user authentication based on the user authentication information and performs the second user authentication by comparing previous contact list information stored in a database of the server to the transmitted portion of contacts in the extracted contact list information, the previous contact list information being stored in association with the user authentication information, and the previous contact list information includes information that is received at the server from the electronic device or another electronic device under control of the application.

7. The method of claim 6, wherein the server determines whether a ratio of common contacts in the previous contact list information and the transmitted portion of contacts in the extracted contact list information with respect to contacts in the previous contact list information is greater than or equal to a threshold ratio, and the server performs the second user authentication if the ratio of common contacts is greater than or equal to the threshold ratio.

8. The method of claim 7, wherein the second transmitting includes:

generating hash values by converting the contacts in the extracted contact list information using a hash function; and transmitting the generated hash values to the server.

9. The method of claim 7, wherein the second transmitting transmits values of one or more items of a name, a telephone number, and an e-mail address from the contacts in the extracted contact list information to the server.

10. The method of claim 7, wherein the second transmitting transmits a portion of a character string in a desired item of the contacts in the extracted contact list information to the server.

11. A non-transitory computer-readable medium comprising a program, when executed by one or more processors, configured to cause the one or more processors to perform the method of claim 7.

12. The system of claim 1, wherein the one or more processors is configured to authenticate the user in response to the determination whether to authenticate the user.

* * * * *